United States Patent [19]

Blair

[11] 4,127,073
[45] Nov. 28, 1978

[54] SUBSOIL TILLAGE TOOTH

[76] Inventor: Calvin B. Blair, Box 97, Barnard, Kans. 67418

[21] Appl. No.: 805,635

[22] Filed: Jun. 13, 1977

[51] Int. Cl.² ............................................. A01B 13/08
[52] U.S. Cl. .......................................... 111/7; 111/86; 172/700; 172/765
[58] Field of Search ............... 172/699, 700, 382, 770, 172/771, 765; 37/193; 111/7

[56] References Cited

U.S. PATENT DOCUMENTS

| | | | |
|---|---|---|---|
| 27,285 | 2/1860 | Griffin | 172/699 X |
| 546,330 | 9/1895 | Howe | 172/382 X |
| 916,868 | 3/1909 | Horinek | 172/699 |
| 2,036,559 | 4/1936 | Zuckerman | 172/699 |
| 2,439,743 | 4/1948 | McEwen | 172/699 |
| 2,632,265 | 3/1953 | Ryan | 172/699 |
| 3,259,087 | 7/1966 | Horton | 111/7 |
| 3,387,668 | 6/1968 | Mathers | 172/700 X |
| 3,393,753 | 7/1968 | Perkins | 172/700 |
| 3,450,212 | 6/1969 | Sylvester | 172/699 |
| 3,538,986 | 11/1970 | Stoffel | 172/699 |
| 3,659,426 | 5/1972 | Caldwell | 172/699 |
| 3,931,858 | 1/1976 | North | 172/699 X |

Primary Examiner—Richard J. Johnson
Attorney, Agent, or Firm—Fishburn, Gold & Litman

[57] ABSTRACT

An improved subsoil plow assembly to be attached to an implement frame employs a soil-splitting leading edge of arcuate cuspate shape, breaking the earth but inhibiting the mixing of the subsoil with the topsoil. That portion below the cuspal apex tends to split away and sidewardly while the portions above the apex are directed upwardly. The plow is preferably comprised of laminate construction providing strength and particular suitability for forming a channel therein directing passage of gaseous or liquid fertilizer into the soil. An alternate embodiment includes a pocket on the leading edge accepting removable and replaceable cuspal inserts useful in differing soil conditions.

7 Claims, 10 Drawing Figures

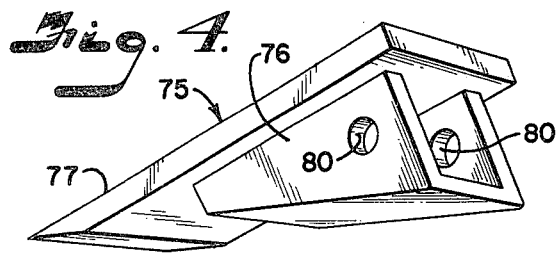
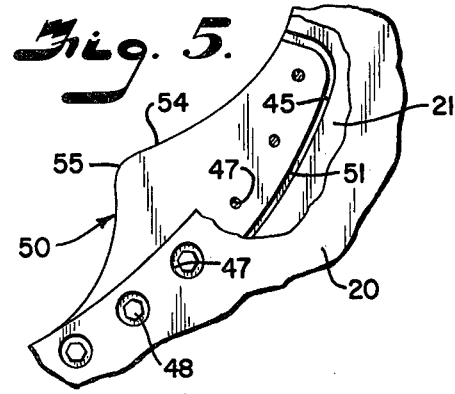
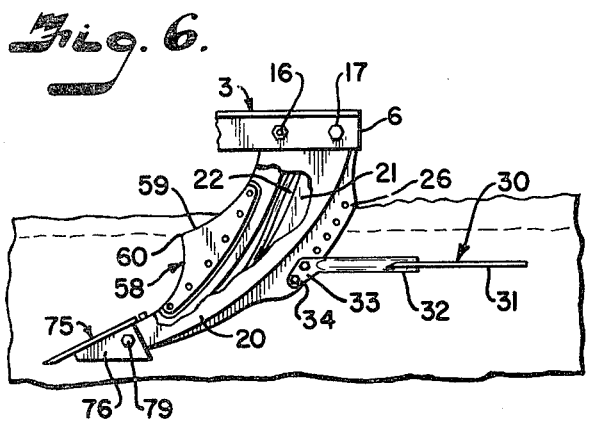
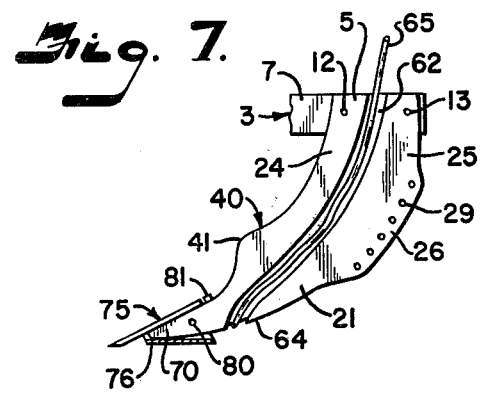
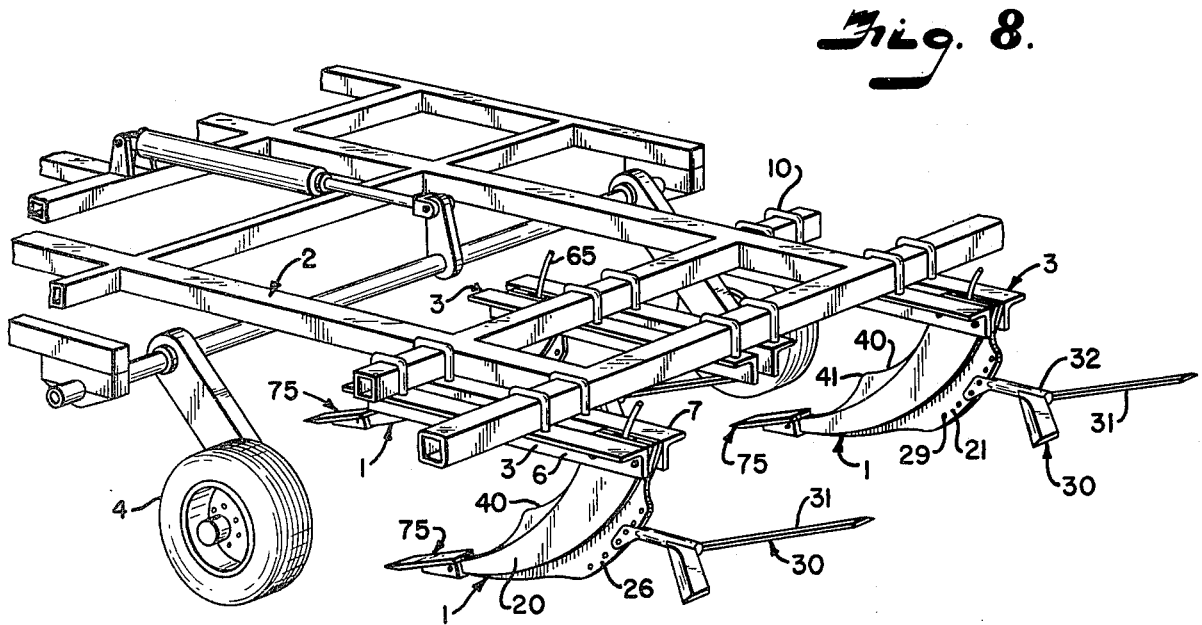

SUBSOIL TILLAGE TOOTH

This invention relates to subsoil plows and more particularly to an improved subsoiler which shatters dense and hardened earth yet inhibits mixing of the subsoil with the topsoil.

The subsoil plow, useful to shatter and open hard packed subsoil, is noted for providing improved moisture storage capability, improved surface and internal drainage, reduced water runoff, and lessened soil erosion losses.

Various subsoil plows or rippers are well known in the art and are typically represented by U.S. Pat. Nos. 3,450,212 and 2,439,743. Prior art subsoil plows are used to fracture hard packed subsoil, improving moisture conservation, but because many of them have a forwardly curving shape, these plows tend to mix the subsoil with the topsoil.

In certain agricultural areas, some mixture may not be harmful but in many other areas blending is undesirable. For example, in many parts of the fertile mixwestern agricultural belt, a layer of fertile topsoil, rich in nutrients and decomposed organic matter, overlies an often highly acidic "hard pan" subsoil layer. To mix this subsoil with the fertile topsoil, as tends to occur upon plowing with a prior art subsoil plow, lowers the pH of the topsoil, thereby acidifying or otherwise changing the plant supporting upper layer to the extent that many varieties of crops grow poorly.

Additionally, many soil types are very abrasive and quickly wear down plows used therein. This problem is compounded by the speed, as often as high as 5 miles per hour, at which the plow must be drawn through the soil to gain the maximum plowing performance and earth breaking characteristics.

The accumulation of heat levels within the plow tooth because of frictional abrasion becomes a major problem and often results in deformation and destruction of the plow tooth. Because the forces are so great on the tooth as it is being drawn through the soil, many prior art types simply employ a thicker plow shank to increase the strength and resistance to deformation. This method tends to result in even more greatly increased heat accumulation because of the greater area of contact to the abrasive soil. The thicker plow shanks also often result in the heaving and turning over of large slabs or blocks of soil as the plow travels.

The present invention seeks to overcome the above difficulties by utilizing a plow tooth having a soil-splitting leading edge comprising an arcuate cusp positioned between a downwardly and forwardly curving tip and the top of a shank. The cuspal portion inhibits mixing of the subsoil with the topsoil, the cuspal apex acting as a separating point inhibiting the flow of subsoil thereabove. The cuspal apex also tends to prevent the heaving and overturning of large slabs or blocks of soil and instead provides smooth and evenly plowed surfaces. The plow tooth has a channel therein for passage of liquid or gaseous fertilizer into the soil which tends to act as a coolant to alleviate the accumulation of high levels of heat energy. The plow is preferably constructed of several laminations providing strength and particular suitability for forming cooling and fertilizer channels therein.

The principal objects of the invention are: to provide a plow adapted for splitting the subsoil, whereby water may infiltrate and roots penetrate; to provide a plow implement which inhibits lifting and mixing of the subsoil with the topsoil; to provide a plow which tends to cut through the soil and inhibits heaving upwardly and overturning large slabs of broken earth; to provide such a plow having a channel therein for passage of liquid or gaseous fertilizer into the soil; to provide a plow having channels therein for cooling the plow and alleviating the build up of heat as the plow travels through the soil; to provide a plow having a shank adapted to receive a removable and replaceable earth breaking tip; to provide such a plow having means for attachment thereto of trailing devices such as sweeps or groovers; to provide such a plow adapted to receive various removable and replaceable soil splitting inserts; to provide attachment means permitting the plow to pivot rearwardly and upwardly should a resisting obstacle be encountered; and to provide a cultivating tool which is sturdy is use, durable in construction, positive in operation, and particularly well adapted for the proposed use.

Other objects and advantages of this invention will become apparent from the following description taken in connection with the accompanying drawings wherein are set forth, by way of illustration and example, certain embodiments of this invention.

FIG. 4 is an enlarged perspective view of an alternate form of the plow including a removable and replaceable tip.

FIG. 5 is an enlarged, fragmentary, side elevational view of an alternate form of the plow including a pocket receiving a leading edge soil splitting insert.

FIG. 6 is a fragmentary, side elevational view illustrating the alternate form of the plow having a soil splitting insert different from that of FIG. 5.

FIG. 7 is a fragmentary, side elevational view showing yet another modified form of the invention which includes a fertilizer transferring channel therethrough.

FIG. 8 is a perspective view illustrating several plows as shown in FIG. 1 in an implement frame.

Figure 1:
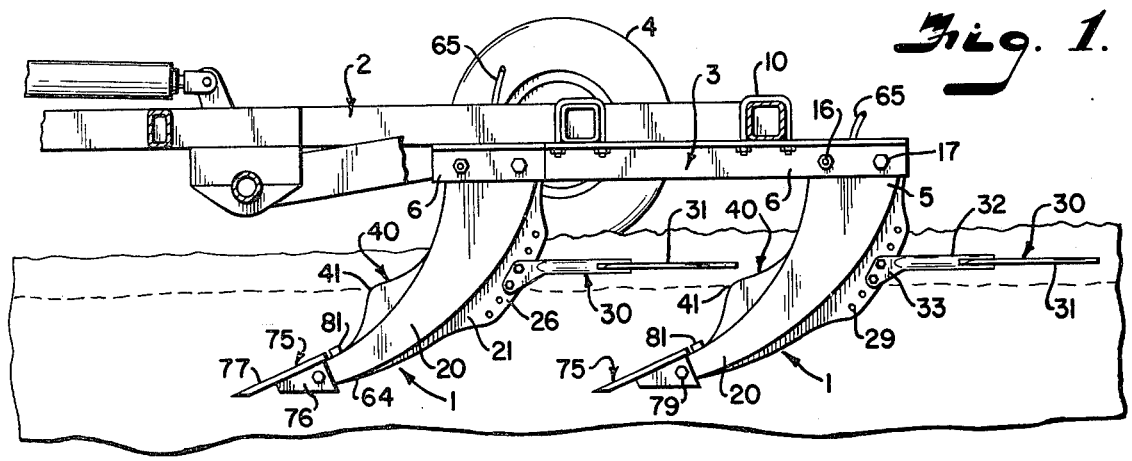
FIG. 1 is a broken side elevational view of a plurality of plows embodying this invention and shown mounted in a frame and emplaced in the soil.
Figure 2:
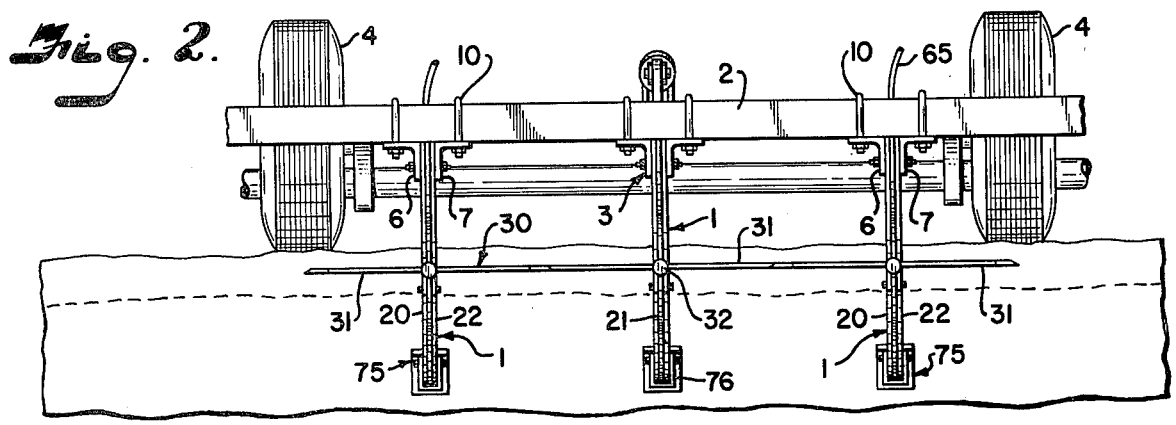
FIG. 2 is a rear elevational fragmentary view of the plows of FIG. 1 also shown emplaced in the soil.
Figure 3:
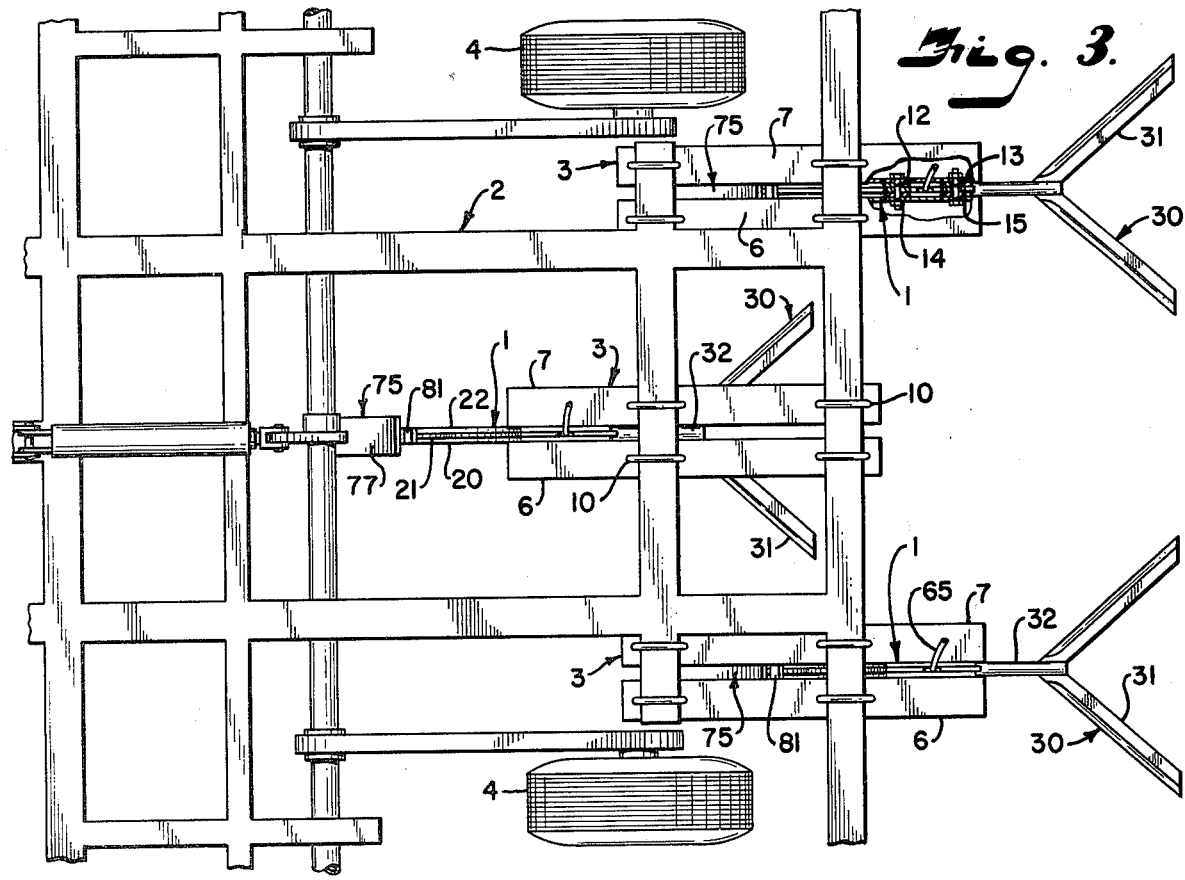
FIG. 3 is a top plan view showing a plurality of plows of FIG. 1 mounted in a frame.

The reference numeral 1, FIG. 1 generally designates a plow shank or tillage tooth having a forwardly and downwardly curving shape designed to rip and open hard packed subsoil. A plurality of such shanks 1 are mounted to an implement frame 2 to be drawn by an appropriate prime mover (not shown) such as a farm tractor. Mounting means 3 secure the top 5 of the shank 1 to the frame 2, including in this example, a pair of parallel, horizontal, elongated angle beams 6 and 7 having downwardly projecting webs disposed laterally a distance sufficient to accommodate the width of the shank 1 and secured to the frame by a plurality of connecting members or U-bolts 10. The shank 1 is positioned between the angle beams 6 and 7 and a pair of front and rear transverse bores 12 and 13, FIG. 3, are aligned with coordinating front and rear bores 14 and 15 extending through the angle beams 6 and 7. Securing the shank 1 to the angle beams 6 and 7, in this example, is a front bolt 16 and a rear shear member or bolt 17, the shear bolt 17 permitting the shank 1 to swing rearwardly and upwardly should an obstacle of sufficient resistance to encountered, thereby preventing the bending or breaking of the shank 1 or other portions of the mounting means 3. The shear bolt 17 is easily replaced, reconnecting the shank 1 to the angle beams 6 and 7.

Although the shank 1 may be formed of a solid bar of hardened material, the device is preferably fabricated of several laminations of a suitable deformation resistant material such as steel, including in this example, side laminations 20 and 22 and a middle lamina 21. The laminate construction provides a substantial strength and resistance to deformation greater than that of a solid plow shank of comparable overall thickness. The laminate construction is especially suited for attachment and alternate embodiments as set forth below. The middle lamina 21 includes a front section 24 and a rear section 25, FIG. 7, the latter projecting rearwardly of the peripheries of the collaterally disposed side laminations 20 and 22 to form a mount 26. A downwardly directed series of transverse bores 29 extend through the mount 26 and provide means for selective connection thereto of a trailing member 30, FIG. 6, such as sweeps, groovers or the like, here including a pair of horizontally diverging sweeps 31 or winged cutting blades secured to a shaft 32 having a bifurcated bracket 33 connectible to the mount 26 by a pair of fasteners or bolts 34. The trailing member 30 is adjusted to the proper elevation on the shank by preferential placement, as depicted in FIGS. 1 and 6, to the desired pair of bores 29, the optimal depth of cut for the sweeps 31 being approximately 4 inches below the surface of the soil to most effectively sever the roots of unwanted plants and to create a broken soil cap and moisture retaining blanket.

The front section 24 of the middle lamina 21 in one embodiment, FIGS. 1 and 7, projects forwardly of the side laminations 20 and 22 to form an arcuate cusp 40 and in another embodiment, FIG. 5, forms a pocket 45 receiving an insert 50 having an arcuate cusp 54. In both embodiments the arcuate cusp 40 or 54 comprises a soil splitting portion of the shank 1, the respective cuspal apexes 41 and 55 acting as separating points tending to split upwardly and away that portion of the soil profile thereabove and to split sidewardly and away that portion therebelow, like the bow of a boat passing through water. The arcuate cusp 40 or 54 in combination with the laminate construction, presents a relatively thin soil splitting leading edge. When compared to a plow shank of solid construction having generally the same equivalent strength and resistance to deformation. Because the shank 1 may be relatively thin, and offers little resistance to the soil, the plow tends to have a relatively long life and less abrasive wear. The arcuate cusp 40 or 54 tends to slice or cut through the soil rather than heaving and turning the earth, further reducing any earth blending tendencies. It is desirable that the cuspal apex 41 or 55 be adjusted to coincide with that line or zone of the soil profile comprising the demarcation of the topsoil from the subsoil so as to resist mixing the two soil types. Although implement frames 2 to which the shank 1 may be mounted typically include adjustment means (not shown) associated with the implement wheels 4, and useable to adjust the depth of the shank 1 into the earth, depth adjustment is preferbly accomplished through the employment of the second embodiment as set forth below.

FIG. 5 illustrates a form of the invention wherein a portion of the middle lamina 21 is disposed rearwardly of the leading edges of the side laminations 20 and 22, forming in this example, a generally semi-circular pocket 45 receiving an insert 50. The insert 50 has an insertion edge 51 of coordinating semi-circular shape. A series of counter bored holes 47 extend transversely through the side laminations and the fitted insert 50 and a number of fasteners or bolts 48 are extended therethrough, securing the insert 50 to the shank 1 and concealing the bolts 48 from the abrasive flow of the soil.

The above described pocket and insert arrangement is readily adpatable to the use of various insert forms having different cuspal shapes. Accordingly, FIG. 6 depicts an alternate insert 58 including an arcuate cusp 59 having a steeper pitch, a more pointed apex 60, and a higher position on the shank 1 than the cusp 54. As referred to above, depth adjustment may be accomplished by employing various inserts, such as the insert 58, having different elevations of the apex on the insert or alternatively, by selective positioning of an insert in the pocket 45. Either method retains a tip, described below, of the shank 1 at the maximum depth of optimize water infiltration and moisture retention of the subsoil rather than varying the downward extension of the shank by the implement wheel adjustment method described above which may extend the shank 1 too deeply into the soil to be effectively drawn by the tractor.

Other features of the shank 1 include an elongated generally vertical channel 62, FIG. 7, extending from the top 5 to a lower portion or heel 64. The channel may be used for cooling of the shank 1, or for passage of fluids, such as fertilizer into the soil. For example, anhydrous ammonia may be used as a fertilizer and also as an excellent cooling material. When the plow shank 1 is drawn through the earth, heat accumulates in the shank 1 and without cooling, the shank 1 may become overheated and tend to bend under normal plowing stress. The plow shank 1 is often drawn at relatively high speeds to provide optimum ground breaking characteristics yet this high rate of speed tends to promote rapid accumulation of heat. As herein illustrated, the shank includes a single channel 62 but in certain circumstances, it may be preferable to employ a plurality of such cooling and/or fertilizer channels. The channel 62 is formed, in this example, by laterally disposing the front section 24 from the rear section 25 of the middle lamina 21 although other methods of providing a channel, such as boring or milling or grooving in the juncture of the laminations, may be employed in suitable situations.

The channel 62, in this example, has a hose 65 extending therethrough which is connected at one end to a holding tank (not shown) on the implement frame 2 to direct the materials into the soil. It is not necessary that the channel 62 include the hose 65 as in some circumstances, better cooling may be accomplished therewithout. The channel 62, without the hose 65, tends to facilitate expansion and cooling of some liquid fertilizers, such as anhydrous ammonia, into gas to be directed into the soil.

The shank 1 terminates in a forwardly projecting point 70, FIG. 7, receiving a removable and replaceable earth breaking member or tip 75, comprising a hollow triangular horn 76 capped by a hardened chisel member 77 secured thereto and projecting outwardly and downwardly. The tip 75 is connected to the point 70 by a fastener or bolt 79 horizontally extending through aligned bores 80 in the horn 76 and the point 70 and prevented from upward and rearward pivotal movement by a block member or stop 81 mounted on the shank immediately rearward of the chisel member 77. Although it is not necessary that the removable and replaceable tip 75 be used in connection with the shank 1, its use is preferably to extend the life of the plow as the tip 75 receives the greatest abrasive wear.

Figure 9:
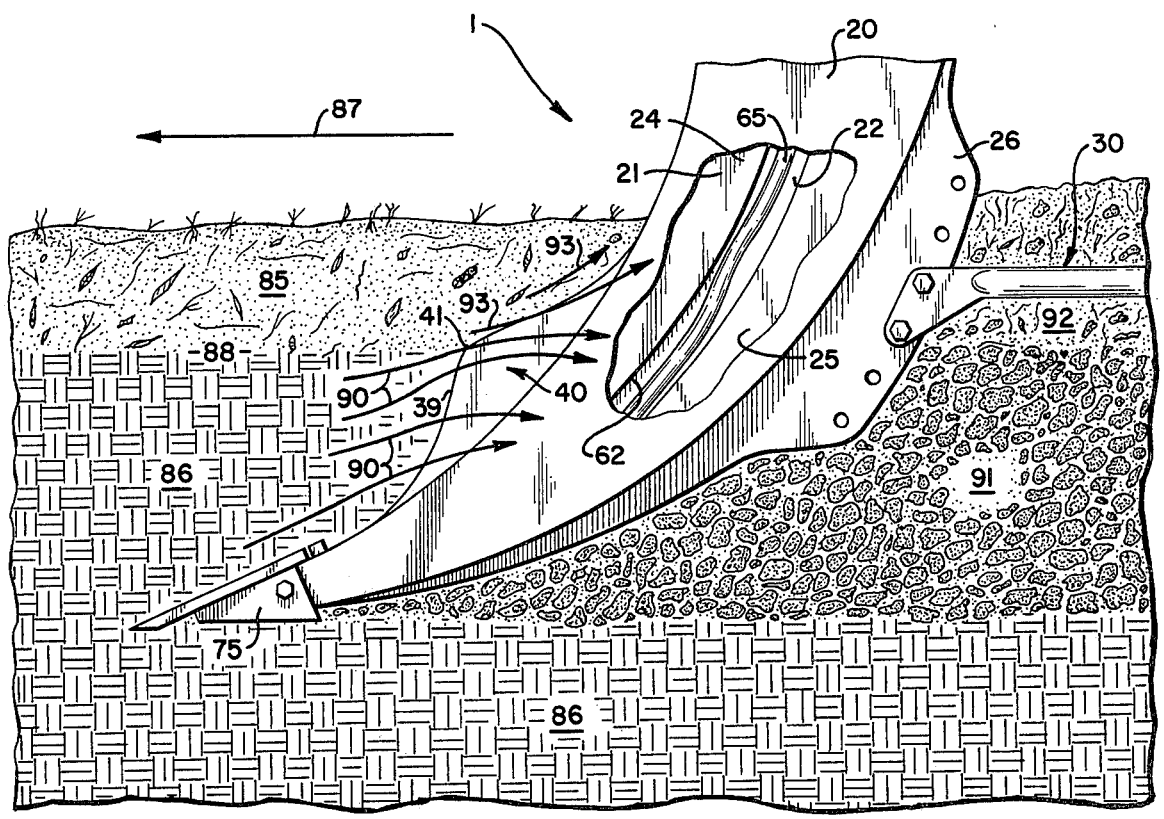
FIG. 9 is an enlarged elevational view showing the plow shown in FIG. 1 as it is drawin through a representative soil profile.

Illustrating the effect of such tillage tooth as it is drawn through the soil, FIG. 9 depicts a representative soil profile having a thin layer of fertile topsoil 85 overlying, in this example, an acidic or otherwise harmful subsoil 86. As the shank 1 is drawn through the soil in the direction of movement symbolized by the arrow 87, the tip 75 rips and shatters the subsoil 86, improving moisture storage capability and internal drainage. To inhibit the soil layers 85 and 86 from mixing upon disruption, the arcuate cusp 40 is positioned in the zone of demarcation 88 and as the shank 1 is drawn, the subsoil 86 moves upwardly, as represented by the arrows 90, along the upwardly curving leading edge 39 generally only to the cuspal apex 41 where it tends to be directed sidewardly, and not mix with the topsoil 85 which flows upwardly as represented by the arrows 93. The arcuate cusp 40 splits and slices through the soil with minimal heaving of the same upwardly in large blocks. In the plow's wake is left generally separate broken subsoil and topsoil layers 91 and 92 prepared for further cultivating operations.

Figure 10:
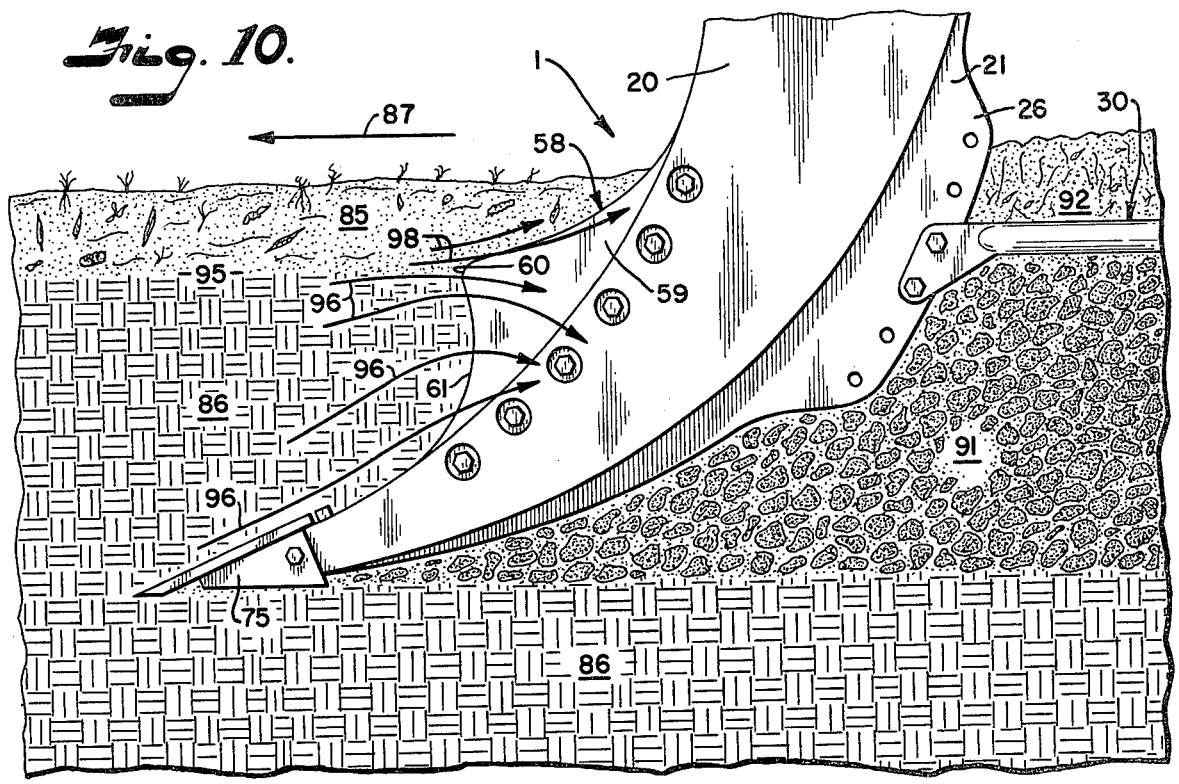
FIG. 10 is an enlarged elevational view of the alternate embodiment of the plow illustated in FIG. 6 as it is drawn through a differently composed soil profile.

FIG. 10 illustrates the soil disturbance characteristics of a plow employing the alternate cuspal insert 58 and is similar to FIG. 9 except that a soil profile is depicted wherein the topsoil 85 comprises a thin layer overlying the acidic or otherwise harmful subsoil 86 and separated by a more distinct line of demarcation 95. The alternate cuspal insert 58 is especially suited for this soil profile as the sharp and pointed apex 60 tends to direct distinct separation of the topsoil and subsoil layers 85 and 86 while permitting maximum depth of cut of the tip 75 into the subsoil. The leading edge 61 below the apex 60 curves upwardly surpassing even a vertical orientation, to where the edge 61 becomes approximately crescent shaped when viewed from the side. As the shank 1 employing the alternate insert 58 is drawn through the soil, the subsoil 86 flows upwardly, as represented by the arrows 96, to the leading edge 61 and the pointed apex 60 where it is directed downwardly at a steeper angle than that represented by the arrows 90, FIG. 9. Above the apex 60, the topsoil 85 is directed upwardly in relatively small fragments, as represented by the arrows 98, similarly to that in connection to FIG. 9.

It is to be understood that while I have described and illustrated one form of my invention, it is not to be limited to the specific form or arrangement of parts herein described and shown.

What is claimed and desired to secure by Letters Patent is:

1. An improved subsoil plow assembly for mounting to a drawn tillage tool frame, said subsoil plow assembly comprising:
   (a) an elongate shank member adapted to extend into the earth and having an upper mounting portion and a downwardly extending, soil-splitting leading edge merging smoothly into a forwardly curving leading edge, said forwardly curving leading edge terminating in an earth breaking tip extending forwardly of said downwardly extending leading edge;
   (b) a vertically oriented arcuate cusp spaced rearwardly of said tip and extended forwardly from said downwardly extending leading edge, said cusp beng positioned above and substantially behind said tip so as to vertically divergingly distribute earth broken by said tip; said cusp having upper and lower edges diverging from each other substantially less than 180° forming a projecting apex positioned generally midway between said tip and said upper mounting portion and generally at the demarcation of the topsoil from the subsoil, said cusp upper edge extending substantially horizontally, rearwardly and upwardly from said apex and blending into said downwardly extending leading edge, said cusp lower edge extending substantially downwardly and forwardly from said apex and blending into said forwardly curving leading edge; and
   (c) means securing said upper mounting portion to said frame for drawing thereof.

2. A subsoil plow as in claim 1 wherein said shank member is composed of a laminate structure including:
   (a) a pair of side wall laminae and
   (b) a middle lamina protruding on said leading edge portion beyond said side wall laminae and forming said arcuate cuspate portion.

3. A laminate structured shank member of claim 2 wherein said middle lamina has a passageway therein extending from said upper mounting portion to said lower end portion for movement therethrough of fluids fertilizing said subsoil and cooling said shank member.

4. A shank member as in claim 1 wherein a winged cutter is removably mounted on said trailing edge portion thereof.

5. A shank member as in claim 1 wherein said arcuate cuspate leading edge portion is removable and replaceable whereby said shank may accommodate a variety of soil splitting members of varying cuspate shape which may be mounted thereto.

6. A shank member as in claim 1 wherein said means securing said shank member to said frame include:
   (a) shear means whereby said shank member may longitudinally pivot free of a sufficiently resisting obstacle.

7. A shank member of claim 1 having a lower end portion including a removable and replaceable tip member.

* * * * *